(12) United States Patent
Ryu et al.

(10) Patent No.: US 10,701,705 B2
(45) Date of Patent: Jun. 30, 2020

(54) METHOD FOR TRANSMITTING FRAME IN WIRELESS LOCAL AREA NETWORK SYSTEM AND WIRELESS TERMINAL USING THE SAME

(71) Applicant: LG ELECTRONICS INC., Seoul (KR)

(72) Inventors: Kiseon Ryu, Seoul (KR); Jinyoung Chun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 16/039,774

(22) Filed: Jul. 19, 2018

(65) Prior Publication Data

US 2019/0029024 A1 Jan. 24, 2019

Related U.S. Application Data

(60) Provisional application No. 62/534,228, filed on Jul. 19, 2017, provisional application No. 62/541,061, filed on Aug. 3, 2017.

(51) Int. Cl.
| | |
|---|---|
| *H04W 72/08* | (2009.01) |
| *H04W 72/04* | (2009.01) |
| *H04W 74/08* | (2009.01) |
| *H04W 84/12* | (2009.01) |
| *H04W 48/12* | (2009.01) |

(Continued)

(52) U.S. Cl.
CPC ........ *H04W 72/082* (2013.01); *H04B 7/2653* (2013.01); *H04L 5/0053* (2013.01); *H04L 5/0055* (2013.01); *H04L 5/1461* (2013.01); *H04W 72/0446* (2013.01); *H04W 74/0808* (2013.01); *H04W 74/0816* (2013.01); *H04W 48/12* (2013.01); *H04W 48/16* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,405,265 B1* | 9/2019 | Chu ..................... | H04W 48/12 |
| 2015/0110093 A1* | 4/2015 | Asterjadhi ............ | H04W 74/08 |
| | | | 370/338 |

(Continued)

*Primary Examiner* — Lonnie V Sweet
(74) *Attorney, Agent, or Firm* — Birch, Stewart, Kolasch & Birch, LLP

(57) ABSTRACT

A method for transmitting a frame in a WLAN system performed by a first wireless device may include: performing a receiving operation for a first STR PPDU within a first time resource based on a wireless channel, wherein the first STR PPDU is received from a second wireless device, and wherein a PHY header includes a BSS color information, an identification information, and an indication information, and, when the first wireless device is indicated by the identification information, in case a NAV timer value according to a logical carrier sense is equal to '0', and in case a result of a physical carrier sense performed for the wireless channel, during a predetermined duration before the receiving operation is started, is in an idle state, performing a transmitting operation for a second STR PPDU within a second time resource overlapping with the first time resource based on the wireless channel.

7 Claims, 16 Drawing Sheets

(51) Int. Cl.
  *H04W 48/16*  (2009.01)
  *H04B 7/26*  (2006.01)
  *H04L 5/14*  (2006.01)
  *H04L 5/00*  (2006.01)

(56) References Cited

U.S. PATENT DOCUMENTS

| | | | |
|---|---|---|---|
| 2016/0330788 A1* | 11/2016 | Zheng | H04W 28/0205 |
| 2017/0064708 A1* | 3/2017 | Noh | H04W 74/0816 |
| 2017/0064739 A1* | 3/2017 | Hedayat | H04W 74/0816 |
| 2017/0078891 A1* | 3/2017 | Cariou | H04W 16/10 |
| 2018/0014327 A1* | 1/2018 | Park | H04W 74/006 |
| 2018/0063788 A1* | 3/2018 | Yang | H04W 12/00502 |
| 2018/0063836 A1* | 3/2018 | Huang | H04W 74/0816 |

* cited by examiner (A)

(B)

METHOD FOR TRANSMITTING FRAME IN WIRELESS LOCAL AREA NETWORK SYSTEM AND WIRELESS TERMINAL USING THE SAME

CROSS-REFERENCE TO RELATED APPLICATIONS

Pursuant to 35 U.S.C. § 119(e), this application claims the benefit of U.S. Provisional Application No. 62/534,228, filed on Jul. 19, 2017, and No. 62/541,061, filed on Aug. 3, 2017, the contents of which are all hereby incorporated by reference herein in their entirety.

TECHNICAL FIELD

This specification relates to wireless communication and, most particularly, to a method for transmitting a frame in a wireless LAN system and a wireless device using the same.

BACKGROUND

A wireless device adopting an In-band Full Duplex (IFD) method or a Simultaneous Transmit and Receive (STR) method may simultaneously perform transmitting operations related to a transmission signal and receiving operations related to a reception signal based on the same frequency resource within the same time resource. Accordingly, wireless capacity may be theoretically increased to a maximum of 2 times the capacity of the Half Duplex (HD) method, which is adopted in the conventional wireless communication system.

The influence of the self-interference may be removed by means of circuits using diverse methods. Generally, in the system level, in order to remove the self-interference, the digital interference removal method and the analog interference removal method may be used at the same time.

SUMMARY OF THE INVENTION

An object of this specification is to provide a method for transmitting a frame in a wireless LAN system based on an enhanced performance and a wireless device using the same.

A method for transmitting a frame in a wireless local area network (WLAN) system according to an exemplary embodiment of this specification may include the steps of performing, by a first wireless device, a receiving operation for a first Simultaneous Transmit and Receive Physical Protocol Data Unit (STR PPDU) within a first time resource based on a wireless channel, wherein the first STR PPDU is received from a second wireless device, and wherein a physical (PHY) header being included in the first STR PPDU includes a Basic Service Set (BSS) color information for identifying from which BSS the first STR PPDU is being received, an identification information for indicating a receiving device of the first STR PPDU, and an indication information for requesting an STR transmission by the receiving device, and, when the first wireless device is indicated by the identification information, in case a Network Allocation Vector (NAV) timer value according to a logical carrier sense is equal to '0', and in case a result of a physical carrier sense performed for the wireless channel, during a predetermined duration before the receiving operation is started, is in an idle state, performing, by the first wireless device, a transmitting operation for a second STR PPDU within a second time resource overlapping with the first time resource based on the wireless channel.

DETAILED DESCRIPTION

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
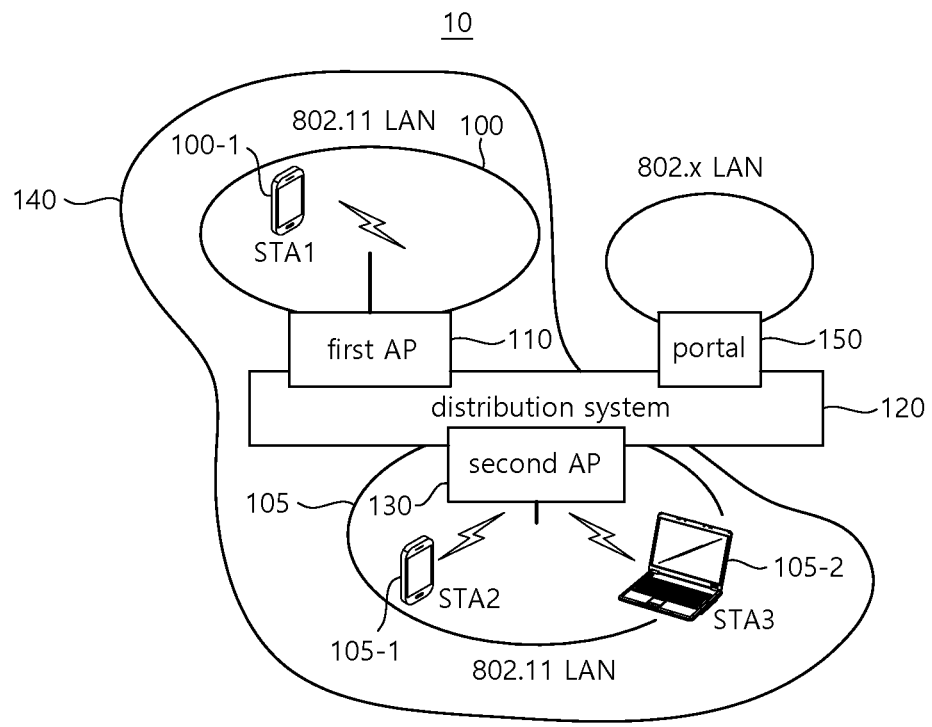
FIG. 1 is a conceptual view illustrating the structure of a wireless local area network (WLAN).
Figure 1:
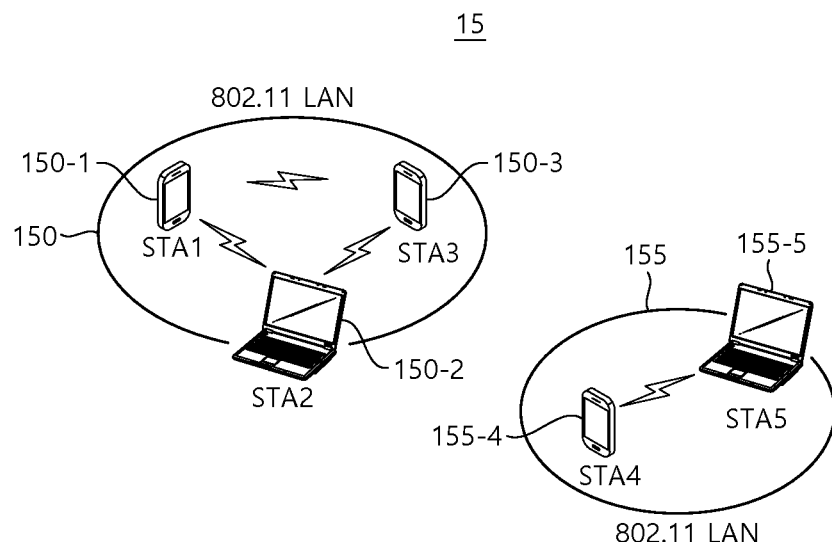

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the WLAN system 10 of the FIG. 1(A) may include one or more infrastructure BSSs 100 and 105 (hereinafter, referred to as BSS). The BSSs 100 and 105 as a set of an access point (hereinafter, referred to as AP) and a station (hereinafter, referred to STA) such as an AP 110 and a STA1 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 110, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the WLAN network (IEEE 802.11) and another network (e.g., 802.X).

In the BSS illustrated in the FIG. 1(A), a network between the APs 110 and 130 and a network between the APs 110 and 130 and the STAs 100-1, 105-1, and 105-2 may be implemented.

FIG. 1(B) illustrates a conceptual view illustrating the IBS S. Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
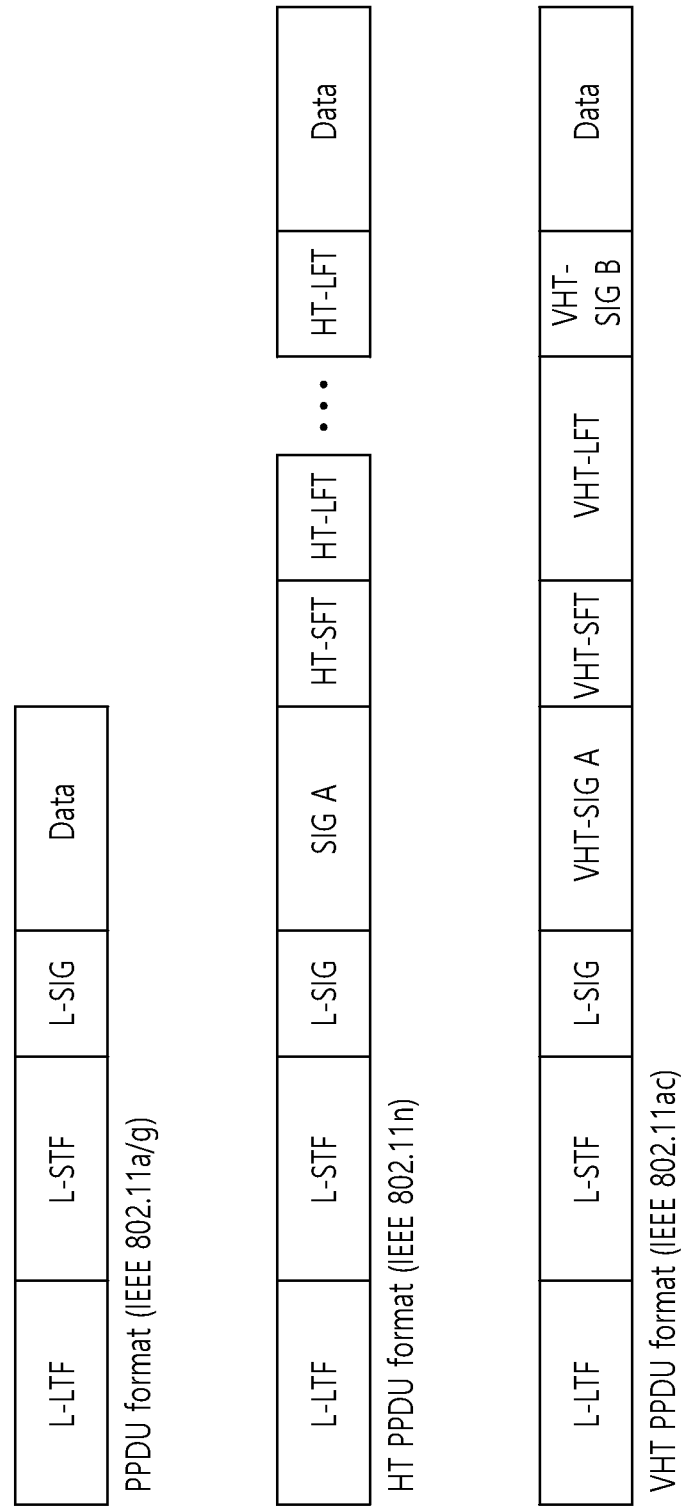
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
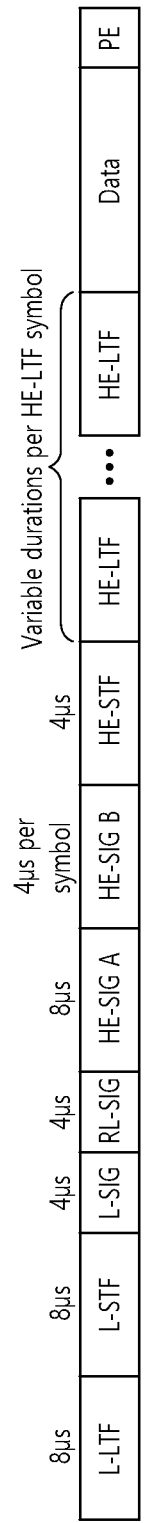
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

The PPDU that is used in the IEEE specification (or standard) is generally described as a PPDU structure that is transmitted within a channel bandwidth of 20 MHz. A PPDU structure that is transmitted within a channel bandwidth being wider than the channel bandwidth of 20 MHz (e.g., 40 MHz, 80 MHz) may correspond to a structure applying linear scaling to the PPDU structure that is used in the channel bandwidth of 20 MHz.

The PPDU structure that is used in the IEEE specification may be generated based on a 64 Fast Fourier Transform (FFT), and a cyclic prefix (CP) portion may be equal to ¼. In this case, a length of a valid (or effective) symbol section (or FFT section) may be equal to 3.2 us, and the CP length may be equal to 0.8 us. And, a symbol duration may be equal to the sum of the valid symbol section and the CP length 4 us(=3.2 us+0.8 us).

Figure 4:
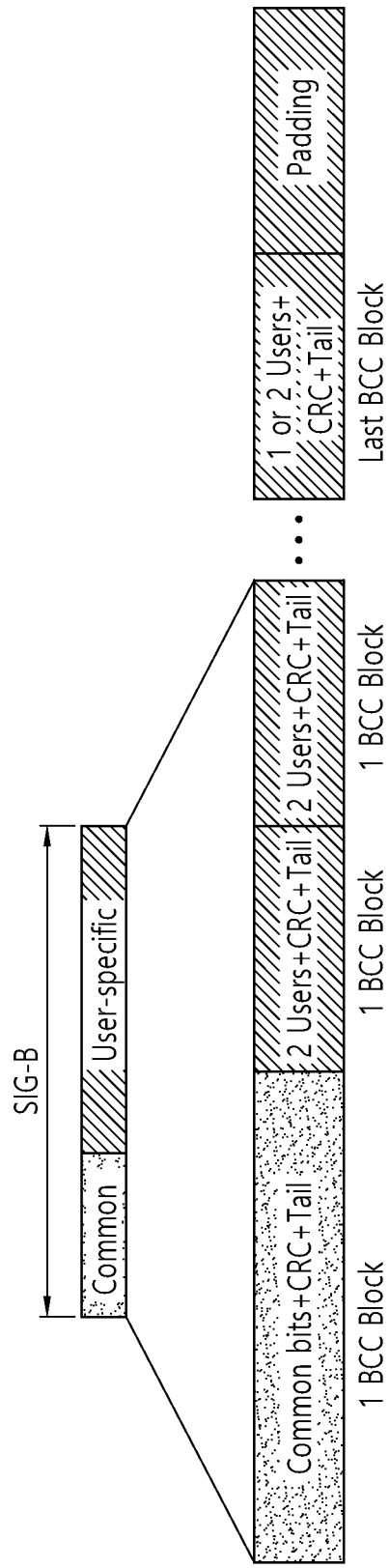
FIG. 4 is a block diagram illustrating one example of HE-SIG-B.

FIG. 4 is a block diagram illustrating one example of HE-SIG-B according to an embodiment.

Figure 8:
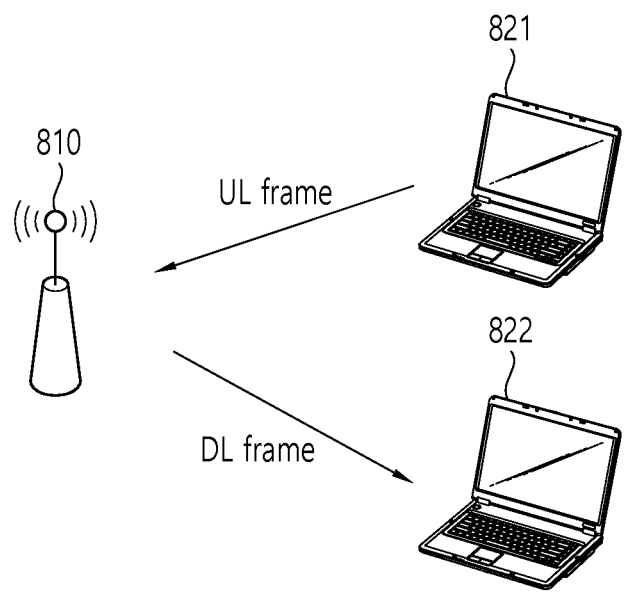

As illustrated in FIG. 4, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 4.

Figure 5:
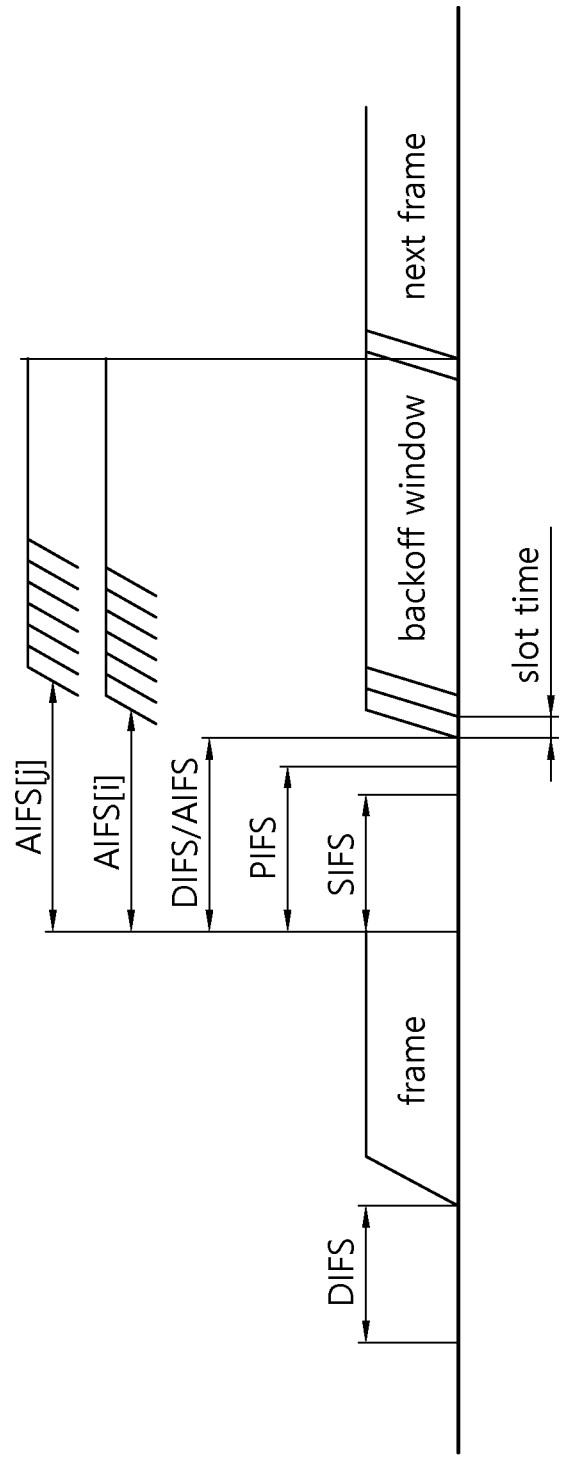
FIG. 5 is a conceptual view illustrating a backoff procedure of an EDCA.

FIG. 5 is a conceptual view illustrating a backoff procedure of an EDCA.

A plurality of STAs may share a wireless medium based on a distributed coordination function (hereinafter referred to as 'DCF'). In order to control the collision between STAs, the DCF may use a carrier sense multiple access/collision avoidance (hereinafter referred to as CSMA/CA) as its access protocol.

In a channel access method using the DCF, if a wireless medium is not used during one DCF inter frame space (DIFS) (i.e., if the channel is idle) the STA may transmit an MPDU that is internally determined.

When it is determined by the carrier sensing mechanism that the wireless medium is used by another STA (i.e., that the channel is busy), the STA may determine the size of the contention window (hereinafter referred to as 'CW') and may then perform a backoff procedure.

For reference, a physical carrier sense that is performed in order to determine whether or not the wireless device is occupied by another STA may be understood as a Clear Channel Assessment (CCA) procedure.

In case a frame that is to be transmitted by the wireless frame is generated, the CCA procedure may be performed for a wireless channel during a predetermined duration (e.g., DIFS) before the frame is transmitted. Additionally, the CCA may be continuously performed by the wireless device until the wireless channel is determined to be in the idle state.

For example, if the intensity of the wireless signal that is received during the predetermined duration exceeds a predetermined threshold value, the wireless device may determine that the wireless device is in a busy state.

As another example, if the intensity of the wireless signal that is received during the predetermined duration does not exceed a predetermined threshold value, the wireless device may determine that the wireless device is in an idle state.

In order to perform the backoff procedure, each STA may configure a backoff value, which is arbitrarily selected within the contention window (CW), in the backoff counter. In this specification, the time indicating the backoff value, which is selected by each STA, may be interpreted and understood as the backoff window shown in FIG. 5.

By counting down the backoff window in slot time units, each STA may perform a backoff procedure for channel access. Among the plurality of STAs, an STA that has selected the relatively shortest backoff window may acquire a transmission opportunity (hereinafter referred to as 'TXOP'), which corresponds to an authority to occupy a medium.

During a time period (or time section) for the TXOP, the remaining STAs may suspend their countdown operations. The remaining STAs may go on standby (or enter a standby mode) until the time period for the TXOP is ended. After the time period for the TXOP is ended, the remaining STAs may resume their countdown operations, which were suspended earlier.

By using the transmission method that is based on such DCF, the problem of collision, which may occur when a plurality of STAs transmit frames simultaneously, may be prevented. However, the channel access method using DCF does not have the concept of transmission priority levels (i.e., user priority levels). More specifically, when using the DCF, the quality of service (QoS) of the traffic that is intended to be transmitted by the STA cannot be ensured.

In order to resolve this problem, a hybrid coordination function (hereinafter referred to as 'HCF'), which is new coordination function, has been defined in 802.11e. The newly defined HCF has a capability (or performance) that is more enhanced than the channel access performance (or capability) of the legacy DCF. For the purposed of enhancing the QoS, the HCF may also use two different types of channel access methods, which correspond to a HCF controlled channel access (HCCA) of a polling method and a contention based enhanced distributed channel access (EDCA).

The STA based on HCF may transmit traffic data based on an Arbitration Interframe Space (AIFS) corresponds to the user priority level instead of the DCF Interframe Space (DIFS), which was used in the legacy method.

Hereinafter, in the exemplary embodiment of the present invention, a user equipment may correspond to a device that is capable of supporting both a WLAN system and a cellular system. More specifically, the user equipment may be interpreted as a UE supporting a cellular system or an STA supporting a WLAN system.

In order to facilitate the description of this specifically, Inter-Frame Spacing, which is mentioned in 802.11, will be described. For example, Inter-Frame Spacing (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

The Inter-Frame Spacing (IFS) may be determined in accordance with attributes specified by the physical layer of the STA regardless of the bit rate of the STA. Among the Inter-Frame Spacing (IFS), with the exception for the AIFS, the remaining IFS may be understood as a fixed value for each physical layer.

The SIFS has the shortest time gap among the IFS mentioned above. Accordingly, the SIFS may be used when an STA occupying a wireless medium is required to maintain its occupation of the medium without any interruption by another STA during a section, wherein a frame exchange sequence is performed.

More specifically, by using the shortest gap between transmissions within a frame exchange sequence, priority may be assigned (or given) for completing the frame exchange sequence that is being performed. Also, an STA performing access to a wireless medium by using SIFS may immediately initiate transmission from an SIFS boundary without determining whether or not the medium is busy.

A duration of an SIFS for a specific physical (PHY) layer may be defined by a SIFSTime parameter. For example, in the physical (PHY) layer of the IEEE 802.11a, IEEE 802.11g, IEEE 802.11n, and IEEE 802.11ac standards (or specifications), the SIFS value is equal to 16 μs.

The PIFS may be used in order to provide the STA with a higher priority level following the SIFS. More specifically, the PIFS may be used in order to acquire a priority for accessing the wireless medium.

The DIFS may be used by an STA transmitting a data frame (MPDU) and a management frame (Mac Protocol Data Unit (MPDU)) based on the DCF.

After the received frame and backoff time are expired, when it is determined that the medium is in an idle state by a carrier sense (CS) mechanism, the STA may transmit a frame.

Figure 6:
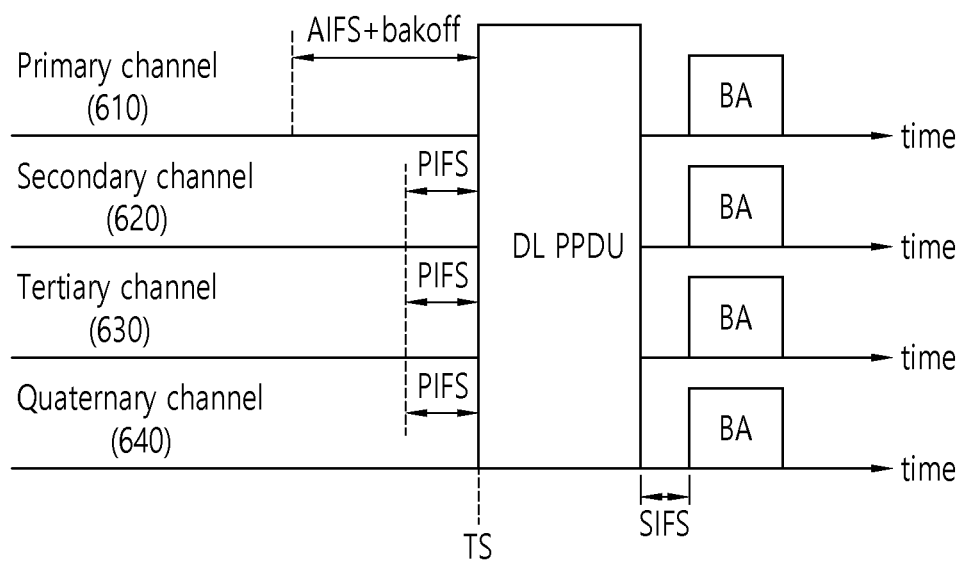
FIG. 6 is a conceptual diagram showing a method for transmitting a frame based upon multiple channels in a related art wireless LAN system.

FIG. 6 is a conceptual diagram showing a method for transmitting a frame based upon multiple channels in a related art wireless LAN system.

Referring to FIG. 6, a first wireless device (e.g., AP) may perform physical carrier sensing on a plurality of channels 610, 620, 630, and 640 in order to transmit a downlink PPDU (DL PPDU) to a second wireless device (e.g., STA).

For example, a primary channel 610 may correspond to a 20 MHz channel, which is preconfigured between the first wireless device (e.g., AP) and the second wireless device (e.g., STA). Herein, the primary channel 610 may be understood as a channel adopting an EDCA backoff procedure, which is described above in FIG. 5.

According to this specification, the primary channel 610 may be referred to as a main channel, and the remaining channels 620, 630, and 640 excluding the primary channel 610 may be referred to as auxiliary channels.

For example, a secondary channel 620 may correspond to a 20 MHz channel that is adjacent to the primary channel 610 frequency-wise. A tertiary channel 630 may correspond to a 20 MHz channel that is adjacent to the secondary channel 620 frequency-wise. And, a quaternary channel 640 may correspond to a 20 MHz channel that is adjacent to the tertiary channel 630 frequency-wise.

According to FIG. 6, the backoff procedure of the EDCA shown in FIG. 5 may only adjust (or control) the main channel (e.g., 610) of FIG. 6. Additionally, when the auxiliary channels (e.g., 620, 630, and 640) are determined to be in an idle state during a PIFS before a starting point (e.g., TS of FIG. 6) of the transmitting operation of the downlink PPDU (DL PPDU), the auxiliary channels (e.g., 620, 630, and 640) may be used for the transmitting operation of the downlink PPDU (DL PPDU) along with the main channel.

Hereinafter, in this specification, a wireless device supporting an In-band Simultaneous Transmit and Receive (hereinafter, referred to as In-band STR) method (hereinafter, referred to as a STR method) may refer to a user equipment (or user device) that is equipped with a capability of successfully transmitting a frame to another wireless device based on the same frequency resource while decoding a frame that is received from the other wireless device at the same time.

According to this specification, in order to support the STR method, it will be provided that a signal, which is transmitted by a wireless device that functions as an STR node, may be sufficiently suppressed by a Self-Interference Cancellation (hereinafter referred to as 'SIC') method. The Self-Interference Cancellation (SIC) method will be described in more detail later on with reference to the accompanying drawings.

Figure 7:
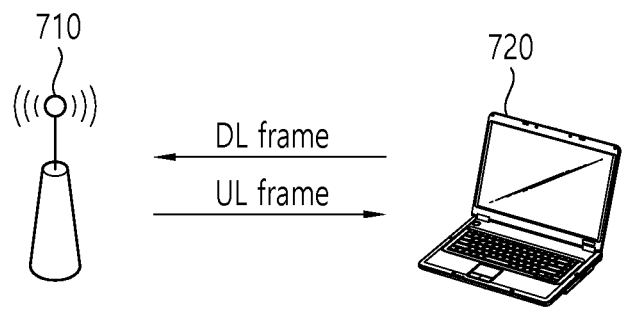
FIG. 7 and FIG. 8 show examples of applying the STR method.

FIG. 7 and FIG. 8 show examples of applying the STR method.

Referring to FIG. 7, communication may be performed in accordance with a Pair-Wise STR method between an AP 710 and an STA 720, which belong to one BSS 700.

For example, while the AP 710 receives an uplink frame (UL frame) from the STA 720, the AP 710 may transmit a downlink frame (DL frame) to the STA 720. In this case, the downlink frame (DL frame) and the uplink frame (UL frame) may be exchanged within a partially overlapping time resource based on the same frequency resource.

For example, while the AP 710 receives an uplink frame (UL frame) from the STA 720, the AP 710 may cancel the self-interference that occurs due to its transmission of the uplink frame (UL frame) based on the Self-Interference Cancellation (SIC) method.

As another example, while the STA 720 receives a downlink frame (DL frame) from the AP 710, the STA 720 may cancel the self-interference that occurs due to its transmission of the downlink frame (DL frame) based on the Self-Interference Cancellation (SIC) method.

Referring to FIG. 8, communication may be performed (or established) between an AP 810 and a first STA 821 and a second STA 822, which belong to one BSS 800, in accordance with an Unrestricted STR method.

For example, while the AP 810 receives an uplink frame (UL frame) from the first STA 821, the AP 810 may transmit a downlink frame (DL frame) to the second STA 822. In this case, the downlink frame (DL frame) and the uplink frame (UL frame) may be exchanged within a partially overlapping time resource based on the same frequency resource.

Figure 9:
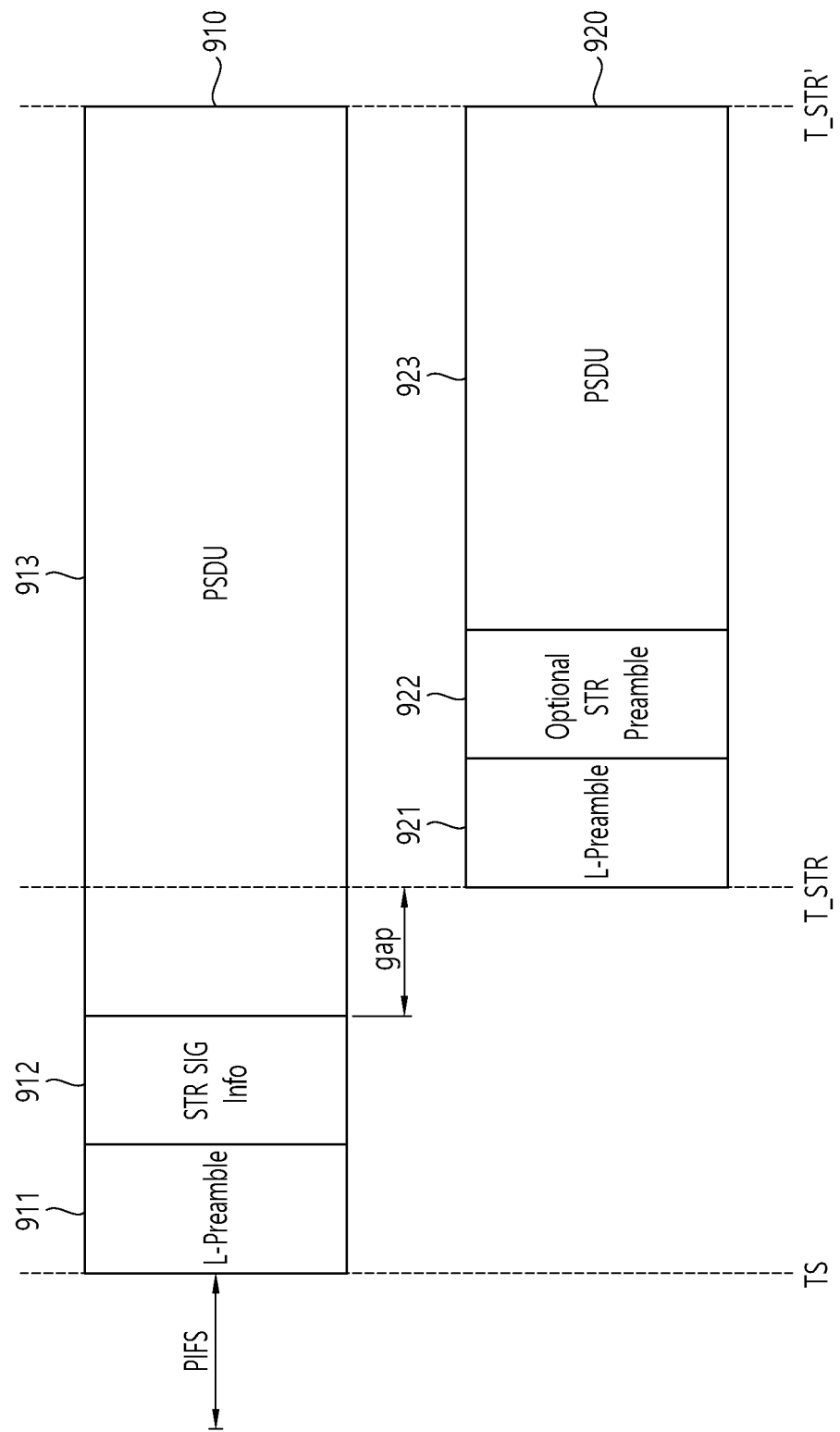
FIG. 9 shows a PPDU for a carrier sensing rule for a wireless device supporting the STR method in a wireless device supporting according to an exemplary embodiment of this specification.

FIG. 9 shows a PPDU for a carrier sensing rule for a wireless device supporting the STR method in a wireless device supporting according to an exemplary embodiment of this specification.

Referring to FIG. 1 to FIG. 9, the wireless device supporting the STR method may perform the transmitting operation and the receiving operation at the same time within the same frequency resource. Hereinafter, a PPDU adopting a new carrier sensing rule for a wireless device supporting the STR method in a wireless LAN system will be described in more detail.

For a simple and clear description of FIG. 9, it may be assumed that the STR method corresponds to the Pair-Wise STR method. More specifically, when communication that is based on the STR method is performed (or established) between an initiator and a responder, an STR initiation PPDU 910 and an In-band STR PPDU 920 may be exchanged within a partially overlapping time resource (e.g., T_STR~T_STR' of FIG. 9) within the same frequency resource.

In this case, the initiator may transmit an STR initiation PPDU 910 to the responder. While the transmitting operation of the STR initiation PPDU 910 is being performed, the initiator may perform receiving operations related to the In-band STR PPDU 920, which is received from the responder within the partially overlapping time resource (e.g., T_STR~T_STR' of FIG. 9).

For example, it may be understood that the initiator corresponds to the AP (e.g., 710 of FIG. 7) and that the responder corresponds to the STA (e.g., 720 of FIG. 7).

Referring to FIG. 9, a format of the STR initiation PPDU 910 and a format of the In-band STR PPDU 920 for performing the communication based on the STR method are illustrated.

The STR initiation PPDU 910 of FIG. 9 may include an L-preamble field 911, an STR SIG information field 912, and a PSDU field 913.

For example, the L-preamble field 911 of FIG. 9 may include BSS color information for identifying from which BSS the STR initiation PPDU 910 is being transmitted, identification information for indicating a receiving device of the STR initiation PPDU 910, and length information related to a transmission duration of the STR initiation PPDU 910.

For example, in case a value included in the BSS color information of the STR initiation PPDU 910 does not correspond to a predetermined value for the BSS for the responder, the responder may not decode the subsequent fields (e.g., 912, 913) of the L-preamble field 911 of the STR initiation PPDU 910.

More specifically, only in a case where the value included in the BSS color information of the STR initiation PPDU 910 corresponds to a predetermined value for the BSS for the responder, the responder may decode the subsequent fields (e.g., 912, 913) of the L-preamble field 911 of the STR initiation PPDU 910.

For example, the identification information for indicating the receiving device of the STR initiation PPDU 910 may be included in the HE-SIG-B field of FIG. 4.

Among the carrier sensing operations performed by the wireless device, logical carrier sensing may be performed for a Network Allocation Vector (NAV) based on the NAV timer.

According to this specification, a receiving device that is not indicated by the identification information included in the STR initiation PPDU 910 may have its NAV timer updated based on a value, which is indicated by the length information included in the STR initiation PPDU 910.

Meanwhile, the receiving device that is indicated by the identification information included in the STR initiation PPDU 910 may perform processing for the transmission of the in-band STR PPDU 920 during a predetermined gap time without updating its NAV timer.

The NAV timer according to this specification may include a basic NAV timer related to an inter-BSS frame and an Intra-BSS NAV timer related to an Intra-BSS frame.

In other words, the wireless device may maintain each of a basic NAV timer, which is updated based on the length information included in the inter-BSS frame, and an intra-BSS NAV timer, which is updated based on the length information included in the Intra-BSS frame.

For example, if a value that is predetermined for the BSS to which the wireless device belongs is not equivalent to the value that is indicated by the BSS color information being included in an PHY header of a PPDU, which is received by the wireless device, the wireless device may determine that the received PPDU is an inter-BSS frame.

For example, if a value that is predetermined for the BSS to which the wireless device belongs is equivalent to the value that is indicated by the BSS color information being included in an PHY header of a PPDU, which is received by the wireless device, the wireless device may determine that the received PPDU is an intra-BSS frame.

For example, the STR SIG information field 912 of FIG. 9 may include control information and downlink scheduling information that are associated with the STR initiation PPDU 910. Further, the STR SIG information field 912 may include control information and uplink scheduling information that are associated with the In-band STR PPDU 920, which is to be transmitted in accordance with the STR initiation PPDU 910.

For example, the PSDU field 913 of FIG. 9 may include a payload for the responder (e.g., 720 of FIG. 7).

The In-band STR PPDU 920 of FIG. 9 may include an L-preamble field 921, an Optional STR preamble field 922, and a PSDU field 923.

For example, the L-preamble field 921 of FIG. 9 may include diverse information for performing decoding of the In-band STR PPDU 920.

For example, the Optional STR preamble field 922 of FIG. 9 may include optional information for the In-band STR PPDU 920.

For example, the PSDU field 923 of FIG. 9 may include a payload for the initiator (e.g., 710 of FIG. 7).

For a simple and clear description of FIG. 9, it may be assumed that the responder (e.g., 720 of FIG. 7) is indicated by the identification information include in the STR initiation PPDU 910, and, it may also be assumed that, when the receiving operation for the STR initiation PPDU 910 is performed, the NAV timer value (i.e., basic NAV timer) of the responder (e.g., 720 of FIG. 7) is equal to '0'.

According to the assumptions presented above, the responder (e.g., 720 of FIG. 7) may be capable of determining whether or not the result of the physical carrier sensing, which is performed for a wireless channel during a predetermined duration (e.g., PIFS of FIG. 9) based on a starting point (e.g., TS of FIG. 9) of the receiving operation for receiving the STR initiation PPDU 910, is in an idle state.

If the intensity of the wireless signal (or radio signal) that is received by the responder (e.g., 720 of FIG. 7) during the predetermined duration (e.g., PIFS of FIG. 9) does not exceed a predetermined threshold level, the result of the physical carrier sensing may be configured to be in an idle state.

For example, the physical carrier sensing may be performed in accordance with a clear channel assessment (CCA) procedure. Additionally, the CCA procedure may be performed in accordance with an Energy Detection (ED) method or a Carrier Sense (CS) method.

According to this specification, when all of the 3 conditions that are described above are satisfied, the responder (e.g., 720 of FIG. 7) may perform transmitting operations for the In-band STR PPDU 920 in accordance with the STR method based on the wireless channel in which the STR initiation PPDU 910 is received within the overlapping time resource (e.g., T_STR~T_STR' of FIG. 9).

Figure 10:
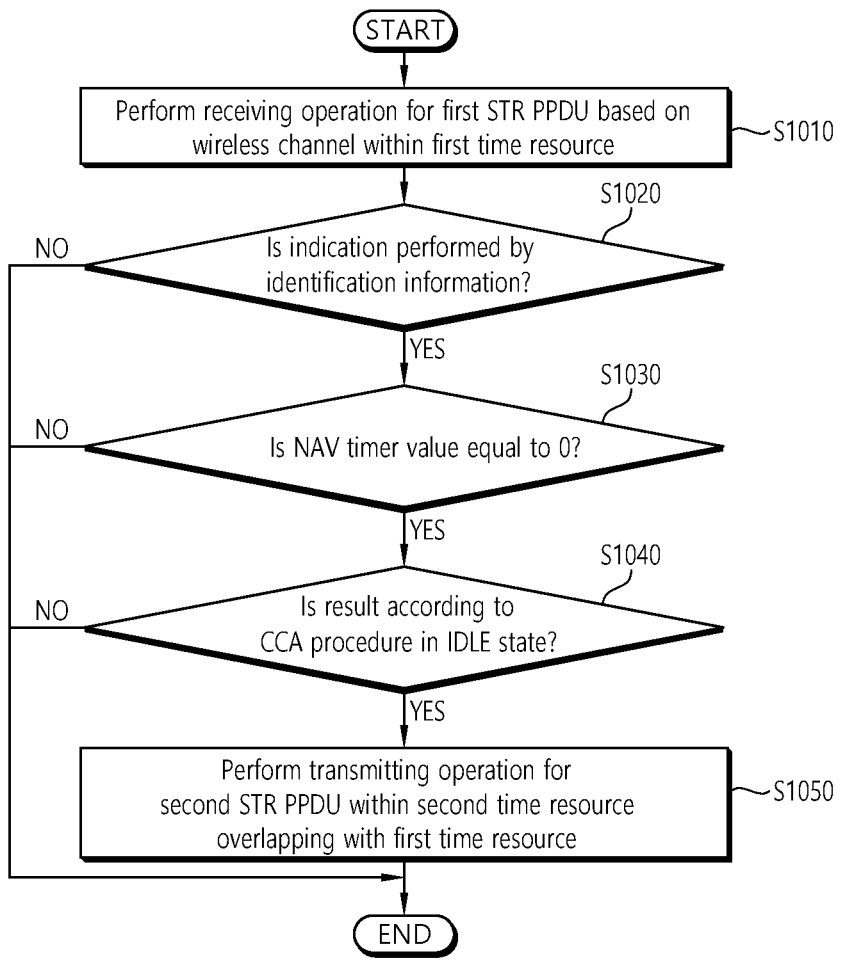
FIG. 10 is a flow chart of a method for transmitting a frame in the wireless LAN system according to the exemplary embodiment of this specification.

FIG. 10 is a flow chart of a method for transmitting a frame in the wireless LAN system according to the exemplary embodiment of this specification.

Referring to FIG. 1 to FIG. 10, in step S1010, a first wireless device may perform receiving operations for a first Simultaneous Transmit and Receive Physical Protocol Data Unit (STR PPDU) based on a wireless channel (or radio channel) within a first time resource.

For a simple and clear description of FIG. 9, the STR method may correspond to the Pair-Wise STR method. In this case, the first wireless device may be understood as an STA (e.g., 720 of FIG. 7). And, the second wireless device may be understood as an AP of FIG. 7 (e.g., 710 of FIG. 7).

Additionally, the wireless channel of FIG. 10 may correspond a primary 20 MHz channel, a primary 40 MHz channel or a primary 80 MHz channel, which is/are predetermined between the first wireless device and the second wireless device.

For example, the first STR PPDU may be received from the second wireless device. The first STR PPDU of FIG. 10 may correspond to the STR initiation PPDU 910 of FIG. 9.

For example, a physical header (PHY header) included in the first STR PPDU may include BSS color information, identification information, and indication information.

For example, the BSS color information may be used for identifying from which Basic Service Set (BSS) the first STR PPDU is being received. Additionally, the identification information may be used for indicating the receiving device of the first STR PPDU. Furthermore, the indication information may be used for requesting a STR transmission performed by the receiving device.

In step S1020, the first wireless device may determine whether or not it is indicated by the identification information being included in the first STR PPDU. If the first wireless device is not indicated by the identification information being included in the first STR PPDU, the process is ended. In order words, if the first wireless device is indicated by the identification information being included in the first STR PPDU, the process proceeds to step S1030.

In step S1030, the first wireless device may determine whether or not a Network Allocation Vector (NAV) timer value according to logical carrier sensing is equal to '0'.

Herein, the NAV timer may include a basic NAV timer related to an inter-BSS frame and an Intra-BSS NAV timer related to an Intra-BSS frame.

For example, the Inter-BSS frame may correspond to a frame, wherein the value that is indicated by the BSS color information being included in the inter-BSS frame is not equivalent to a predetermined value, which is predetermined for the BSS to which the first wireless device belongs.

For example, the Inter-BSS frame may correspond to a frame, wherein the value that is indicated by the BSS color information being included in the inter-BSS frame is equivalent to a predetermined value, which is predetermined for the BSS to which the first wireless device belongs.

For example, when the NAV timer corresponds to the basic NAV timer, the basic NAV timer may be updated based on the length information that is included in the inter-BSS frame.

For example, when the NAV timer corresponds to the Intra-BSS NAV timer, the Intra-BSS NAV timer may be updated based on the length information that is included in the intra-BSS frame.

According to the related art, in case the value of the basic NAV timer and the value of the Intra-BSS NAV timer are all equal to '0', the wireless device determined the NAV timer value according to logical carrier sensing to be equal to '0'.

Conversely, according to the exemplary embodiment of this specification, in case the value of the basic NAV timer is equal to '0' regardless of whether or not the value of the intra-BSS NAV timer is equal to '0', the wireless device may determine the NAV timer value according to logical carrier sensing to be equal to '0'.

According to the exemplary embodiment of this specification, if the NAV timer value of the first wireless device is not equal to '0', the process is ended. In order words, if the NAV timer value of the first wireless device is equal to '0', the process proceeds to step S1040.

In step S1040, the first wireless device may determine whether or not the result of the physical carrier sensing, which is performed for the wireless channel during a predetermined duration (i.e., PIFS of FIG. 9) before a starting time point (i.e., TS of FIG. 9) at which the receiving operation of the first STR PPDU, was in an idle state.

The physical carrier sensing according to the exemplary embodiment of this specification may be performed in accordance with a clear channel assessment (CCA) procedure.

For example, if the intensity of the wireless signal (or radio signal) that is received by the first wireless device through the wireless channel during a PIFS does not exceed a predetermined threshold level, the result according to the CCA procedure may be configured to be in an idle state.

For example, if the intensity of the wireless signal (or radio signal) that is received by the first wireless device through the wireless channel during a PIFS exceeds a predetermined threshold level, the result according to the CCA procedure may be configured to be in a busy state.

If the intensity of the wireless signal (or radio signal) that is received by the responder (e.g., 720 of FIG. 7) during the predetermined duration (e.g., PIFS of FIG. 9) does not exceed a predetermined threshold level, the result of the physical carrier sensing may be configured to be in an idle state.

If the result according to the physical carrier sensing is determined to be in a busy state, the process is ended. In other words, in case the result according to the physical carrier sensing is determined to be in an idle state, the process proceeds to step S1050.

In this specification, when all of the 3 conditions, which are shown in S1020 to S1040, are satisfied, the STR performed by the wireless device may be supported. However, in this case, it shall be understood that the order by which steps S1020 to S1040 are satisfied is not restricted (or limited).

In step S1050, the first wireless device may perform transmitting operations for the second STR PPDU based on a wireless channel within a second time resource that overlaps with the first time resource (e.g., T_STR~T_STR' of FIG. 9).

For example, the second STR PPDU may be transmitted to the second wireless device. The second STR PPDU of FIG. 10 may correspond to the In-band STR PPDU 920 of FIG. 9.

For example, a transmission channel of the second STR PPDU may correspond to a resource unit according to an Orthogonal Frequency Division Multiple Access (OFDMA) that is assigned through the first STR PPDU or may correspond to a 20 MHz channel, a 40 MHz channel, a 80 MHz channel or a 160 MHz channel.

For example, a physical header (PHY header) included in the second STR PPDU may include BSS color information, identification information, and indication information.

For example, it shall be understood that the transmitting operations for the second STR PPDU can be performed, in case the value of the basic NAV timer is equal to '0' regardless of whether or not the value of the intra-BSS NAV timer is equal to '0'.

Additionally, in order to perform the receiving operation for the first STR PPDU (i.e., 910 of FIG. 9) and the transmitting operation for the second STR PPDU, the self-interference cancellation (SIC) method may be applied within the second time resource that overlaps with the first time resource (e.g., T_STR~T_STR' of FIG. 9).

According to the exemplary embodiment of this specification, since the STR method is applied for one channel, the frequency efficiency of the wireless LAN may be enhanced. Therefore, according to the exemplary embodiment of this specification, a wireless LAN system having an enhanced performance may be provided.

Figure 11:
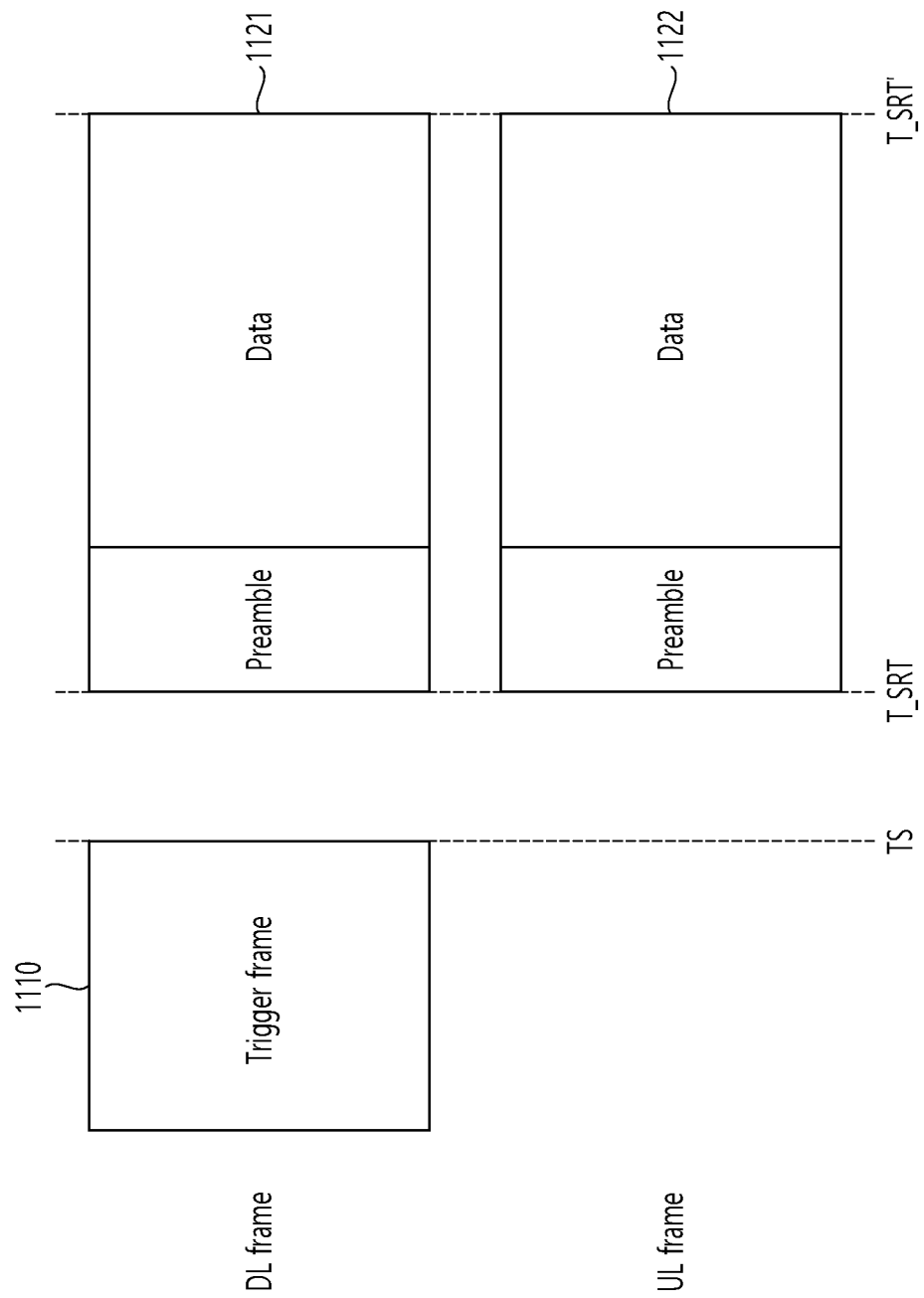
FIG. 11 shows a PPDU for a carrier sensing rule for a wireless device supporting the STR method in a wireless device supporting according to another exemplary embodiment of this specification.

FIG. 11 shows a PPDU for a carrier sensing rule for a wireless device supporting the STR method in a wireless device supporting according to another exemplary embodiment of this specification.

For a simple and clear description of FIG. 11, it may be assumed that the STR method corresponds to the Pair-Wise STR method. More specifically, when communication that is based on the STR method is performed (or established) between an initiator and a responder, a downlink PPDU 1121 and an STR PPDU 1122 may be exchanged within a partially overlapping time resource (e.g., T_STR~T_STR' of FIG. 11) within the same frequency resource.

In this case, the initiator may transmit a trigger frame 1110 to the responder. The trigger frame 1110 of FIG. 11 may be understood as a frame triggering the transmission of the downlink PPDU 1121 and the transmission of the STR PPDU 1120.

For example, it may be understood that the initiator corresponds to the AP (710 of FIG. 7) and that the responder corresponds to the STA (720 of FIG. 7).

For the physical carrier sensing, the responder (720 of FIG. 7) that has received the trigger frame 1110 may perform the CCA procedure for the wireless channel during a time duration (TS~T_STR) of FIG. 11. For example, the CCA procedure may be performed in accordance with the Energy Detection (ED) method. For example, the time duration (TS~T_STR) of FIG. 11 may correspond to an SIFS.

Additionally, for a virtual carrier sensing, the responder (720 of FIG. 7) may determine the state of the wireless channel by using the NAV timer value. For example, the NAV timer may be understood as the above-described basic NAV timer.

In the exemplary embodiment of FIG. 11, the state of the wireless channel may be determined to be in an idle state through the physical carrier sensing and the virtual carrier sensing.

In this case, the responder (720 of FIG. 7) may perform the receiving operation for the downlink PPDU 1121 and the transmitting operation for the STR PPDU 1122 through one wireless channel (e.g., a primary 20 MHz channel) at the same time within an overlapping time resource (e.g., T_STR~T_STR' of FIG. 11).

Figure 12:
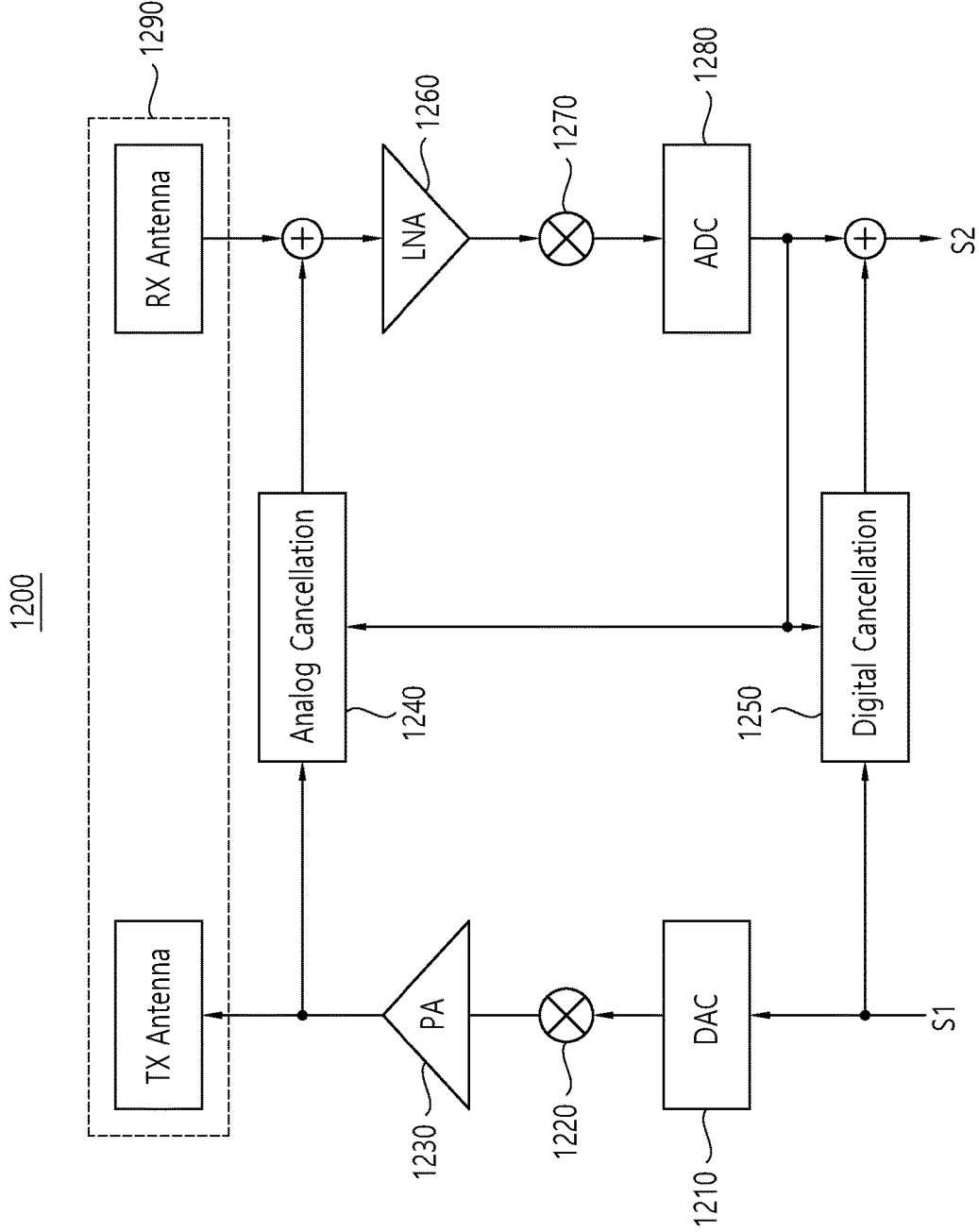
FIG. 12 is a block diagram showing an interior of the wireless device implementing a self-interference cancellation method for the STR method according to an exemplary embodiment of this specification.

FIG. 12 is a block diagram showing an interior of the wireless device implementing a self-interference cancellation method for the STR method according to an exemplary embodiment of this specification.

The wireless device 1200 according to the exemplary embodiment of this specification may include a digital-to-analog converter (DAC) 1210, a mixer 1220, a power amplifier (PA) 1230, an analog interference removing circuit 1240, a digital interference removing circuit 1250, a low noise amplifier (LNA) 1260, an integrator 1270, an analog-to-digital converter (ADC) 1280, and an antenna unit 1290.

A digital signal S1, which is generated by processing data that are to be transmitted with an encoding process and a modulation process, may be inputted to the digital-to-analog converter (DAC) 1210.

The digital-to-analog converter (DAC) 1210 may perform a digital-to-analog converting operation based on the digital signal S1, which is delivered from a modulator 1200a.

The mixer 1220 may multiply an analog signal of a baseband, which is received from the digital-to-analog converter (DAC) 1210, by a sinusoidal signal corresponding to a carrier frequency (fc), which is generated by a local oscillator (not shown).

The power amplifier (PA) 1230 may amplify an RF signal being outputted from the mixer 1220. The power amplifier (PA) 1230 may deliver a transmission signal, which is amplified by a transmission (TX) antenna of the antenna unit 1290 and the analog interference removing circuit 1240.

The analog interference removing circuit 1240 may remove a self-interference signal that is introduced through the antenna unit 1290. For example, a Finite Impulse Response (FIR) filter may be sed for the analog interference removing circuit 1240.

For example, the analog interference removing circuit 1240 may include a tap using N number of delay lines and an attenuator being connected to each tap. In this case, the weight being applied to the attenuator that is connected to each tap may be determined based on the output signal of the analog-to-digital converter 1280.

The digital interference removing circuit 1250 may output a signal for removing the digital interference based on the digital signal S1 and an output signal of the analog-to-digital converter 1280.

The low noise amplifier (LNA) 1260 may reduce noise by amplifying a signal that is received from the reception (RX) antenna.

By performing integration on a signal, which is generated by multiplying the output signal of the low noise amplifier (LNA) 1260 by the sinusoidal signal corresponding to the carrier frequency (fc), which is generated by the local oscillator (not shown), the integrator 1270 may convert the RF signal to a baseband signal.

The analog-to-digital converter 1280 may convert the baseband signal, which is delivered from the integrator 1270, to a digital signal.

A signal reception signal R2 having the digital interference removed therefrom may be generated based on the output signal of the analog-to-digital converter 1280 and the output signal of the digital interference removing circuit 1250.

The antenna 1290 may include a transmission antenna (TX antenna) and a reception antenna (RX antenna).

Figure 13:
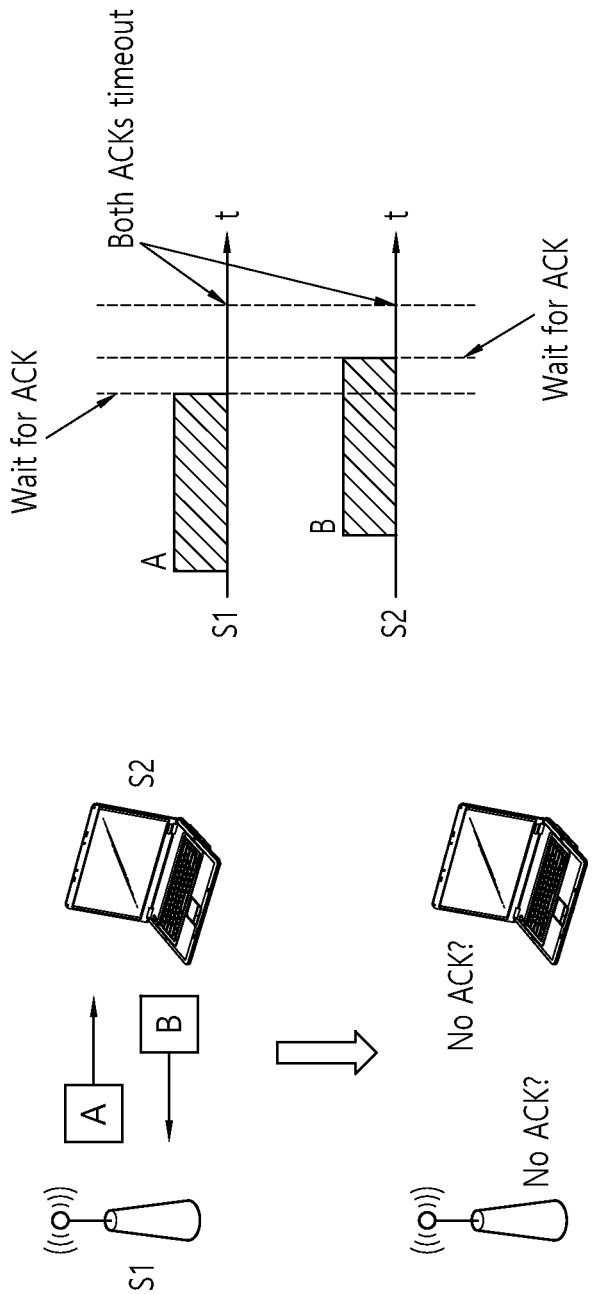
FIG. 13 is a diagram showing predictable problems in the viewpoint of the transmission rule of a related art ACK frame when communication is performed based on the STR method.

FIG. 13 is a diagram showing predictable problems in the viewpoint of the transmission rule of a related art ACK frame when communication is performed based on the STR method.

Referring to FIG. 13, it may be assumed that an exchange of frame is performed between two wireless devices in accordance with the Pair-Wise STR method.

In the related art wireless LAN system, after performing transmission, generally, a highest priority level is assigned to an operation of waiting (or standing-by) for an ACK frame.

For example, since the second wireless device S2 is still transmitting packet B to the first wireless device S1 even after accurately receiving packet A, the second wireless device S2 cannot transmit an ACK frame for packet A.

According to the related art, in case communication is performed based on the STR method, it may be required to clearly define for how long the first wireless device S1 is to wait (or be on stand-by) before performing re-transmission of packet A. Additionally, it may also be required to clearly define at which time point an ACK frame for announcing (or notifying) the successful reception of packet B is to be transmitted by the first wireless device S1.

Figure 14:
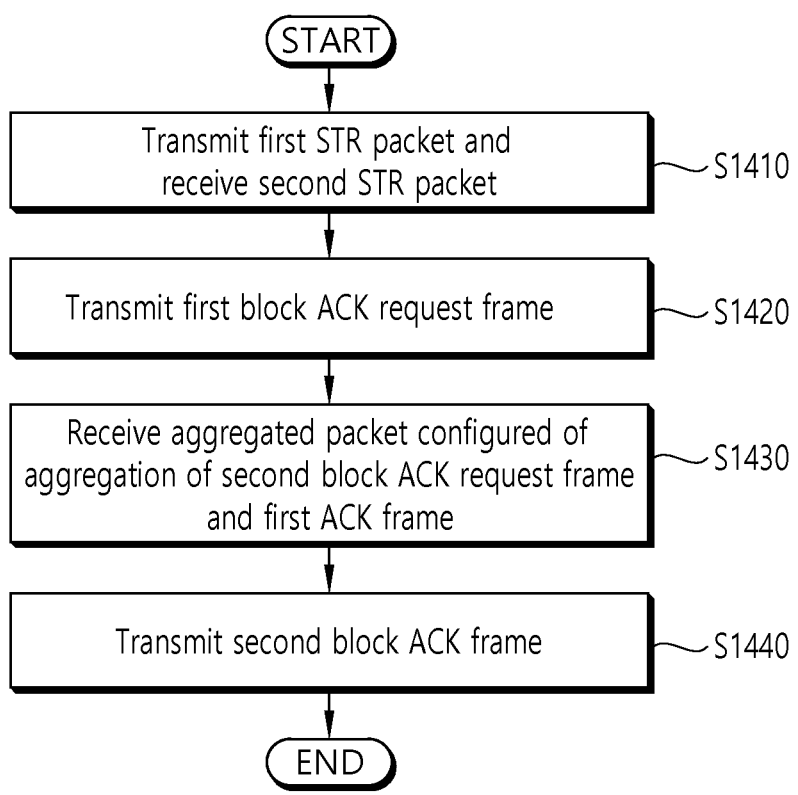
FIG. 14 and FIG. 15 are flow charts showing a method for transmitting an ACK frame when communication is performed based on the STR method according to an exemplary embodiment of this specification.
Figure 15:
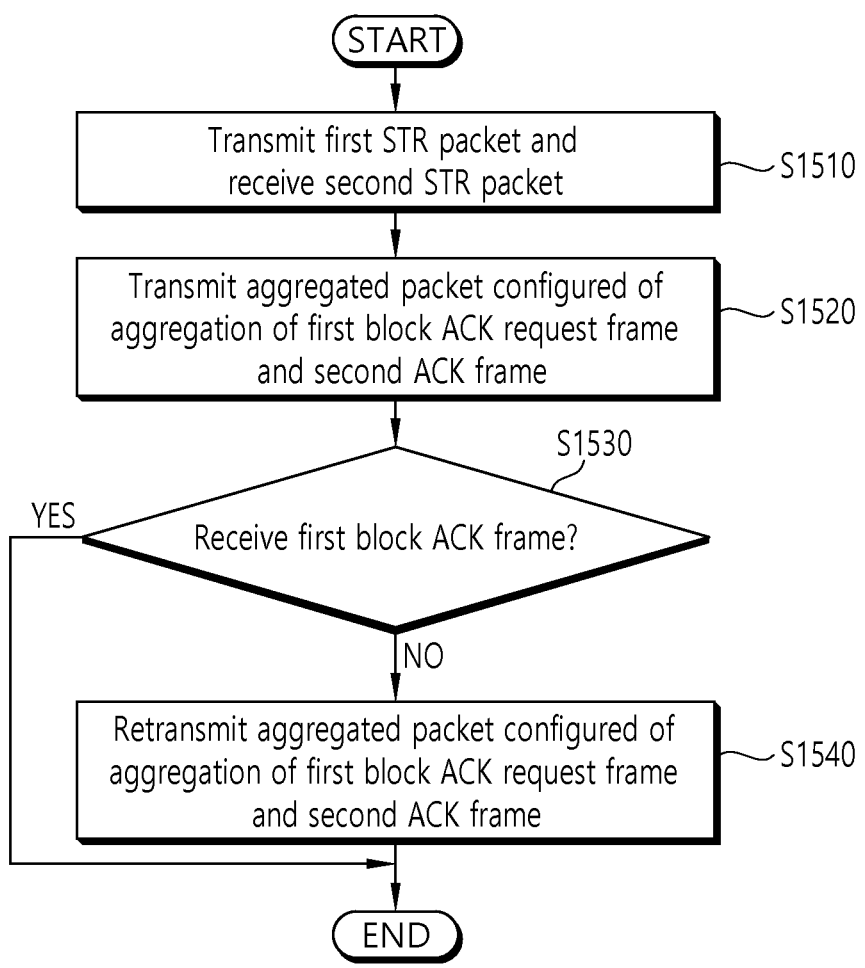

FIG. 14 and FIG. 15 are flow charts showing a method for transmitting an ACK frame when communication is performed based on the STR method according to an exemplary embodiment of this specification.

Hereinafter, for a simple description of FIG. 14 and FIG. 15, an STR initiation PPDU (e.g., 910 of FIG. 9) and an In-band STR PPDU (e.g., 920 of FIG. 9) may be referred to as an STR packet.

Referring to FIG. 14 and FIG. 15, an ACK policy subfield of the STR packet according to the exemplary embodiment of this specification may be set as a block ACK ('11') type.

For example, an ACK policy subfield of the STR initiation PPDU (e.g., 910 of FIG. 9) according to the STR method may be set as a block ACK ('11') type. For example, an ACK policy subfield of the In-band STR PPDU (e.g., 920 of FIG. 9) according to the STR method may be set as a block ACK ('11') type.

According to the exemplary embodiment, only in a case where a Block ACK Request (BAR) frame is received after the reception of the STR packet (e.g., 910 of FIG. 9), the responder (e.g., 720 of FIG. 7) supporting the STR method may transmit an ACK frame (e.g., Block ACK, Compressed-Block ACK, Multi-STA Block ACK) as a response to at least one MPDU within the STR packet, which is received from the initiator (e.g., 710 of FIG. 7).

Hereinafter, an ACK process that is based on the STR packet including the ACK policy subfield, which is set as a block ACK ('11') type, will be described in detail.

Referring to FIG. 9 and FIG. 14, in step S1410, the initiator (e.g., 710 of FIG. 7) may transmit a first STR packet (e.g., 910 of FIG. 9) to the responder (e.g., 720 of FIG. 7). For example, the ACK policy subfield of the first STR packet (e.g., 910 of FIG. 9) may be set as the block ACK ('11') type.

In this case, the responder (e.g., 720 of FIG. 7) that has received the first STR packet (e.g., 910 of FIG. 9) may wait (or be on stand-by) for the transmission of a first ACK frame for the first STR packet (e.g., 910 of FIG. 9) until a first block ACK request frame is received from the initiator (e.g., 710 of FIG. 7).

It may be understood that the initiator (e.g., 710 of FIG. 7) can receive a second STR packet (e.g., 920 of FIG. 9) from the responder (e.g., 720 of FIG. 7) within the partially overlapping time resource (e.g., T_STR~T_STR' of FIG. 9).

For example, the ACK policy subfield of the second STR packet (e.g., 920 of FIG. 9) may be set as the block ACK ('11') type.

In step S1420, the initiator (e.g., 710 of FIG. 7) may transmit a first block ACK request frame to the responder (e.g., 720 of FIG. 7).

Herein, the first block ACK request frame may be understood as a frame requesting for the transmission of the first ACK frame corresponding to the first STR packet (e.g., 910 of FIG. 9) to the responder (e.g., 720 of FIG. 7).

For example, the first STR packet (e.g., 910 of FIG. 9) and the first block ACK request frame may be transmitted from a separate TXOP.

In step S1430, the initiator (e.g., 710 of FIG. 7) may receive a packet configured of an aggregation of a first ACK frame according to the first block ACK request frame and a second block ACK request frame from the responder (e.g., 720 of FIG. 7).

Herein, the second block ACK request frame may be understood as a frame requesting for the transmission of a second ACK frame corresponding to the second STR packet (e.g., 920 of FIG. 9) to the initiator (e.g., 710 of FIG. 7).

In step S1440, the initiator (e.g., 710 of FIG. 7) may transmit a second ACK frame according to the second block ACK request frame to the responder (e.g., 720 of FIG. 7).

Referring to FIG. 9 and FIG. 15, in step S1510, the initiator (e.g., 710 of FIG. 7) may transmit a first STR packet (e.g., 910 of FIG. 9) to the responder (e.g., 720 of FIG. 7). For example, the ACK policy subfield of the first STR packet (e.g., 910 of FIG. 9) may be set as the block ACK ('11') type.

In this case, the responder (e.g., 720 of FIG. 7) that has received the first STR packet (e.g., 910 of FIG. 9) may wait (or be on stand-by) for the transmission of a first ACK frame for the first STR packet (e.g., 910 of FIG. 9) until a first block ACK request frame is received from the initiator (e.g., 710 of FIG. 7).

It may be understood that the initiator (e.g., 710 of FIG. 7) can receive a second STR packet (e.g., 920 of FIG. 9) from the responder (e.g., 720 of FIG. 7) within the partially overlapping time resource (e.g., T_STR~T_STR' of FIG. 9).

For example, the ACK policy subfield of the second STR packet (e.g., 920 of FIG. 9) may be set as an immediate ACK.

In step S1520, the initiator (e.g., 710 of FIG. 7) may transmit a packet configured of an aggregation of a first block ACK request frame and a second block ACK frame corresponding to the second STR packet (e.g., 920 of FIG. 9) to the responder (e.g., 720 of FIG. 7).

Herein, the first block ACK request frame may be understood as a frame requesting for the transmission of the first ACK frame corresponding to the first STR packet (e.g., 910 of FIG. 9) to the responder (e.g., 720 of FIG. 7).

Herein, the second ACK frame may be understood as a frame being transmitted in accordance with the ACK policy of the second STR packet (e.g., 920 of FIG. 9).

For example, the aggregated packet that is configured of an aggregation of the first STR packet (e.g., 910 of FIG. 9) and the first block ACK request frame and the second ACK frame may be transmitted from a separate TXOP.

In step S1530, the initiator (e.g., 710 of FIG. 7) may determine whether or not the first ACK frame according to the first block ACK request frame is received from the responder (e.g., 720 of FIG. 7).

If the first ACK frame according to the first block ACK request frame is received from the responder (e.g., 720 of FIG. 7), the process is ended. On the other hand, if the first ACK frame according to the first block ACK request frame is not received from the responder (e.g., 720 of FIG. 7), the process proceeds to step S1540.

In step S1540, the initiator (e.g., 710 of FIG. 7) may re-transmit an aggregated packet, which is configured of an aggregation of the first block ACK request frame and the second ACK frame, to the responder (e.g., 720 of FIG. 7). In this case, the re-transmitting operation may be performed several times within a range that does not exceed a predetermined number of re-transmission sessions.

Although it is not shown in FIG. 14 and FIG. 15, as an additional exemplary embodiment, the initiator (e.g., 710 of FIG. 7) may transmit a first block ACK request frame after the transmission of the first STR packet (e.g., 910 of FIG. 9).

In this case, when an SIFS is elapsed from the transmission time point of the first block ACK request frame, the initiator (e.g., 710 of FIG. 7) may transmit a second ACK frame to the responder (e.g., 720 of FIG. 7). Additionally, when an SIFS is elapsed from the reception time point of the first block ACK request frame, the responder (e.g., 720 of FIG. 7) may transmit a first ACK frame to the initiator (e.g., 710 of FIG. 7). In other words, the first ACK frame and the second ACK frame may be exchanged between the wireless devices based on the STR method.

According to this exemplary embodiment, in case the communication is performed (or established) according to the STR method, the transmission time point of the ACK frame may be clarified. Accordingly, a wireless LAN system having a more enhanced performance may be provided.

Figure 16:
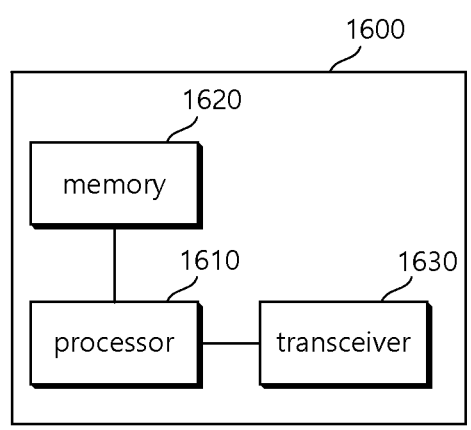
FIG. 16 is a block diagram illustrating a wireless device according to an embodiment.

FIG. 16 is a block diagram illustrating a wireless device according to an embodiment.

Referring to FIG. 16, the wireless device may be an STA capable of implementing the foregoing embodiments, which may be an AP or a non-AP STA. Further, the wireless device may correspond to the foregoing user or a transmitting terminal that transmits a signal to a user.

As illustrated in FIG. 16, the wireless device includes a processor 1610, a memory 1620, and a transceiver 1630. The processor 1610, the memory 1620, and the transceiver 1630 may be configured as separate chips or as a single chip having at least two blocks/functions.

The transceiver 1630 may be a device including a transmitter and a receiver. When a particular operation is performed only any one of the transmitter and the receiver may operate or both the transmitter and the receiver may operate. The transceiver 1630 may include one or more antennas for transmitting and/or receiving a radio signal. Further, the transceiver 1630 may include an amplifier for amplifying a reception signal and/or a transmission signal and a band-pass filter for transmission on a particular frequency band.

The processor 1610 may implement the functions, processes, and/or methods proposed in the present specification. For example, the processor 1610 may perform operations according to the aforementioned embodiments. That is, the processor 1610 may perform operations disclosed in the embodiments of FIG. 1 to FIG. 15.

The processor 1610 may include an application-specific integrated circuit (ASIC), other chipsets, a logic circuit, a data processor, and/or a converter to convert a baseband signal and a radio signal from one to the other.

The memory 1620 may include a read-only memory (ROM), a random access memory (RAM), a flash memory, a memory card, a storage medium, and/or other storage devices.

According to an exemplary embodiment of this specification, provided herein are a method for transmitting a frame in a wireless LAN system based on an enhanced performance and a wireless device using the same.

Although specific embodiments have been illustrated in the detailed description of the present specification, various changes and modifications are possible within the scope of the present specification. Therefore, the scope of the present specification should not be construed as being limited to the foregoing embodiments but should be determined by the following claims and equivalents thereof.

What is claimed is:

1. A method for transmitting a frame in a wireless local area network (WLAN) system, the method comprising:

performing, by a first wireless device, a receiving operation for a first Simultaneous Transmit and Receive Physical Protocol Data Unit (STR PPDU) within a first time resource based on a wireless channel, wherein the first STR PPDU is received from a second wireless device, and wherein a physical (PHY) header being included in the first STR PPDU includes a Basic Service Set (BSS) color information for identifying from which BSS the first STR PPDU is being received, identification information related to a receiving device of the first STR PPDU, and STR transmission information for requesting an STR transmission by the receiving device;

when the first wireless device is related to the identification information, in case a Network Allocation Vector (NAV) timer value based on a logical carrier sense is equal to '0', and in case a result of a physical carrier sense performed for the wireless channel, during a predetermined duration before the receiving operation is started, is in an idle state, performing, by the first wireless device, a transmitting operation for a second STR PPDU within a second time resource overlapping with the first time resource based on the wireless channel, wherein the NAV timer includes a basic NAV timer being related to an inter-BSS frame and an Intra-BSS NAV timer being related to an Intra-BSS frame; and in case a value of the basic NAV timer is equal to '0' regardless of whether or not a value of the Intra-BSS NAV timer is equal to '0', performing, by the first wireless device, the transmitting operation for the second STR PPDU based on the wireless channel.

2. The method of claim 1, wherein, when the NAV timer corresponds to the basic NAV timer, the basic NAV timer is updated based on length information being included in the Inter-BSS frame, and wherein the Inter-BSS frame corresponds to a frame having a value that is related to the BSS color information being included in the Inter-BSS frame that is not equivalent to a value being predetermined for a BSS to which the first wireless device belongs.

3. The method of claim 1, wherein, when the NAV timer correspond to the Intra-BSS NAV timer, the Intra-BSS NAV timer is updated based on length information being included in the Intra-BSS frame, and wherein the Intra-BSS frame corresponds to a frame having a value that is related to the BSS color information being included in the Intra-BSS frame that is equivalent to a value being predetermined for a BSS to which the first wireless device belongs.

4. The method of claim 1, wherein, in order to perform the receiving operation for the first STR PPDU and the transmitting operation for the second STR PPDU at the same time, a Self-Interference Cancellation scheme is applied to the first wireless device within the second time resource.

5. The method of claim 1, wherein the wireless channel corresponds to a primary 20 MHz channel, a primary 40 MHz channel, or a primary 80 MHz channel being predetermined between the first wireless device and the second wireless device.

6. The method of claim 1, wherein a transmission channel of the second STR PPDU corresponds to a resource unit based on an Orthogonal Frequency Division Multiple Access (OFDMA) being assigned through the first STR PPDU or to a 20 MHz channel, a 40 MHz channel, an 80 MHz channel, or a 160 MHz channel.

7. A first wireless device for performing a method for transmitting a frame in a wireless local area network (WLAN) system, the first wireless device comprising:

a transceiver transmitting or receiving a radio signal; and a processor controlling the transceiver, wherein the processor is configured to:

perform a receiving operation for a first Simultaneous Transmit and Receive Physical Protocol Data Unit (STR PPDU) within a first time resource based on a wireless channel, wherein the first STR PPDU is received from a second wireless device, and wherein a physical (PHY) header being included in the first STR PPDU includes Basic Service Set (BSS) color information for identifying from which BSS the first STR PPDU is being received, identification information related to a receiving device of the first STR PPDU, and STR transmission information for requesting an STR transmission by the receiving device;

when the first wireless device is related to the identification information, in case a Network Allocation Vector (NAV) timer value based on a logical carrier sense is equal to '0', and in case a result of a physical carrier sense performed for the wireless channel, during a predetermined duration before the receiving operation is started, is in an idle state, to perform a transmitting operation for a second STR PPDU within a second time resource overlapping with the first time resource based on the wireless channel, wherein the NAV timer includes a basic NAV timer being related to an inter-BSS frame and an Intra-BSS NAV timer being related to an Intra-BSS frame; and in case a value of the basic NAV timer is equal to '0' regardless of whether or not a value of the Intra-BSS NAV timer is equal to '0', perform, by the first wireless device, the transmitting operation for the second STR PPDU based on the wireless channel.

* * * * *